United States Patent
Saito et al.

(10) Patent No.: US 6,376,768 B1
(45) Date of Patent: Apr. 23, 2002

(54) WIRE GUIDING OUT STRUCTURE OF WIRE PROTECTOR

(75) Inventors: Satoshi Saito; Tomohiro Ikeda, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 34 days.

(21) Appl. No.: 09/695,982

(22) Filed: Oct. 26, 2000

(30) Foreign Application Priority Data

Oct. 29, 1999 (JP) .......................................... 11-308920

(51) Int. Cl.[7] ................................................ H02G 3/10
(52) U.S. Cl. ............................ 174/48; 220/3.7; 248/49; 52/220.3
(58) Field of Search ............................ 174/48, 50, 58, 174/63, 49, 66, 72 A; 220/3.2, 4.02, 291, 3.6, 3.7; 298/906, 49; 439/535; 361/641; 52/220.3

(56) References Cited

U.S. PATENT DOCUMENTS

| | | | |
|---|---|---|---|
| 5,918,837 A | * 7/1999 | Vicain | 174/72 A |
| 5,954,301 A | * 9/1999 | Joseph et al. | 248/68.1 |
| 6,005,187 A | * 12/1999 | Havazo | 174/48 |
| 6,011,221 A | * 1/2000 | Lecinski et al. | 174/72 A |
| 6,019,323 A | * 2/2000 | Jette | 248/49 |
| 6,076,779 A | * 6/2000 | Johnson | 248/49 |

FOREIGN PATENT DOCUMENTS

| | | |
|---|---|---|
| JP | 7-20021 | 4/1995 |
| JP | 11-120986 | 4/1999 |

* cited by examiner

*Primary Examiner*—Dean A. Reichard
*Assistant Examiner*—Dhiru R Patel
(74) *Attorney, Agent, or Firm*—Armstrong, Westerman & Hattori, LLP (57) ABSTRACT

A wire guiding out structure of a wire protector 1 enabling that the wires are easily bent and guided out from the wire protector 1 is provided. A wire guide wall 8 is retractively formed in a wire guiding out portion 10 of a wire protector body 2 in use of flexible hinges 7. A notched opening 21 is formed inbetween wire guiding out walls 19 and 20 for being engaged with the wire guide wall at both sides of the wire guiding out portion 10. The wires are bent and guided out along the wire guide wall in a state of the wire guide wall being closed. The wire guide wall 8 further includes a hook 15 and the wire guiding out portion 10 further includes a supporting shaft 16. The wire guide wall 8 further includes latches 18 and the wire guiding out walls 19 and 20 further include engaging parts 32. The wire guiding out portion 10 further includes engaging holes 29 to be engaged with latches 28 of the cover 3. Except the wire guiding out portion 10, the wire protector 1 is insert molded within a resin material so as to form a part of a battery connecting plate.

5 Claims, 10 Drawing Sheets

WIRE GUIDING OUT STRUCTURE OF WIRE PROTECTOR

BACKGROUND OF THE INVENTION (1) Field of the Invention

This invention relates to a wire guiding out structure of a wire protector, in which wires are bent toward a connection direction thereof and guided out from the wire protector. The wire protector is employed in a battery connecting plate for use in, for example, an electric vehicle.

(2) Description of the Related Art

Figure 7:
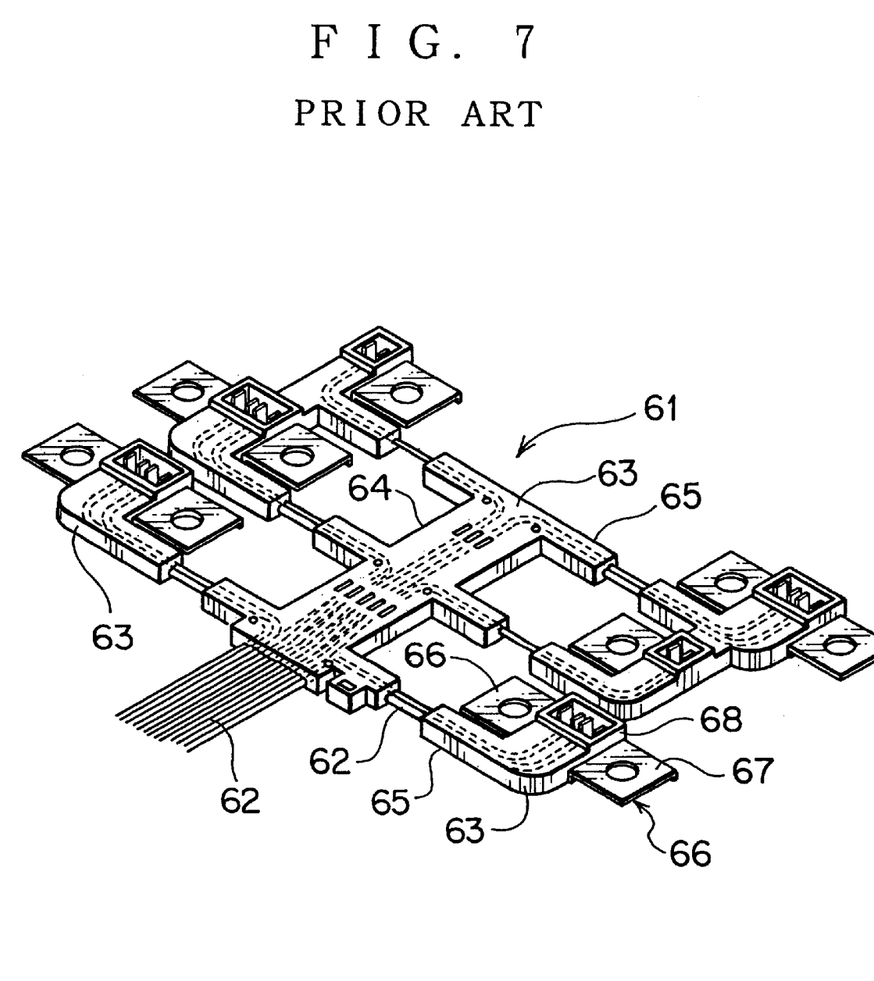
FIG. 7 is a perspective view illustrating a conventional wire protector.

FIG. 7 illustrates a wire protector employed in a battery connecting plate for use in an electric vehicle, which is described in Japanese Patent Application Laid-Open No. H11-120986.

This wire protector 61 is produced inside a resin body 63 by an insert molding in a state that a plurality of wires 62 are wired in a required pattern.

The wires 62 consists of a trunk part 64 at the center and a plurality of branch parts 65 branching off left and right from the trunk part 64. The wires 62 in a bundle are straightly guided out from the branch parts 65 toward outside. At a branch part 63, a terminal 66 is crimp-connected to an end of the wires 62 and an electric contact 67 having a square plate-shape of the terminal 66 is exposed to the outside of the branch part 63. In a frame 68 of the branch part 63, a part for connecting to a fuse of the terminal 66 is exposed.

A fuse (not shown in the figure) is connected to the part for connecting to the fuse in an after process and the electric contact 67 is connected to the wires 62 by way of the fuse. An electrode 70 of a battery 69 (see FIG. 10) is inserted through the electric contact 67 and the wires 62 are connected to an external voltage detector (not shown in the figure).

Figure 8:
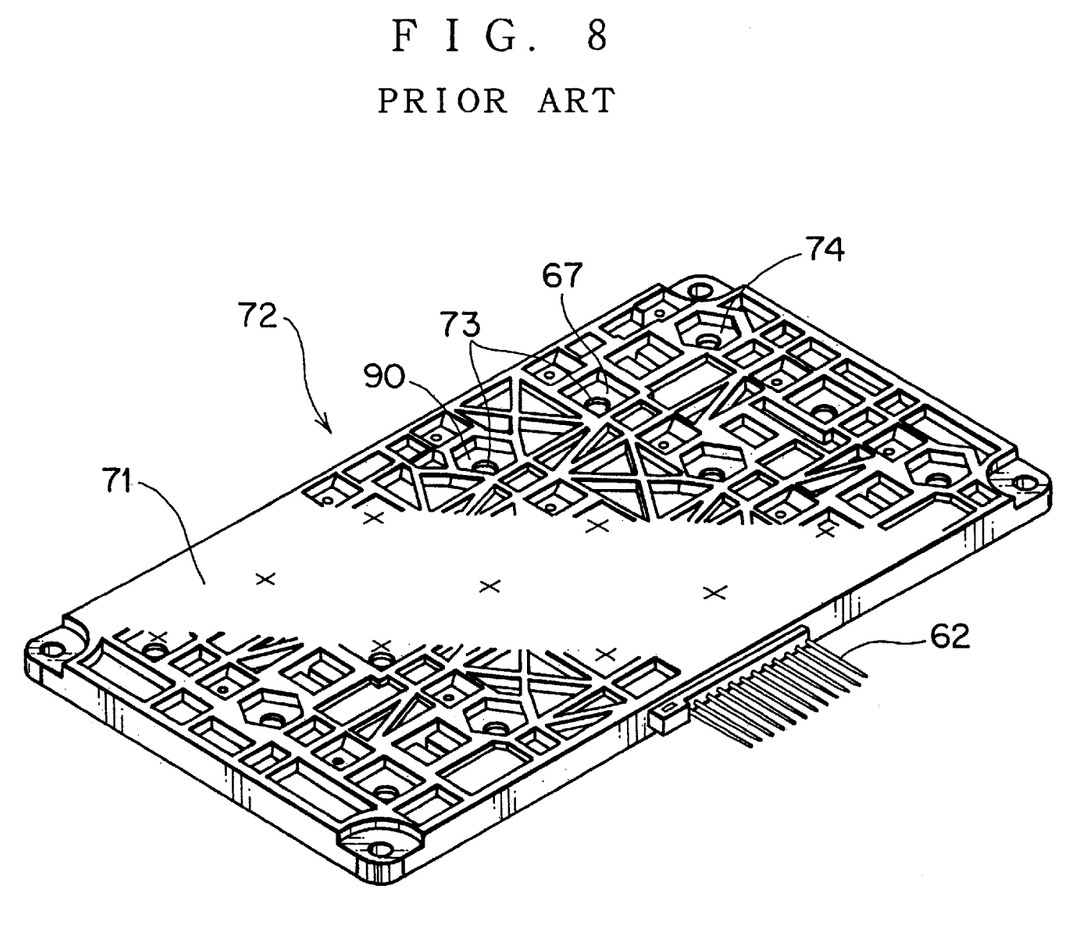
FIG. 8 is a perspective view illustrating a battery connecting plate, including a wire protector.

FIG. 8 shows a battery connecting plate 72, in which the above wire protector 61 (see FIG. 7) is insert molded in a resin body 71.

Figure 9:
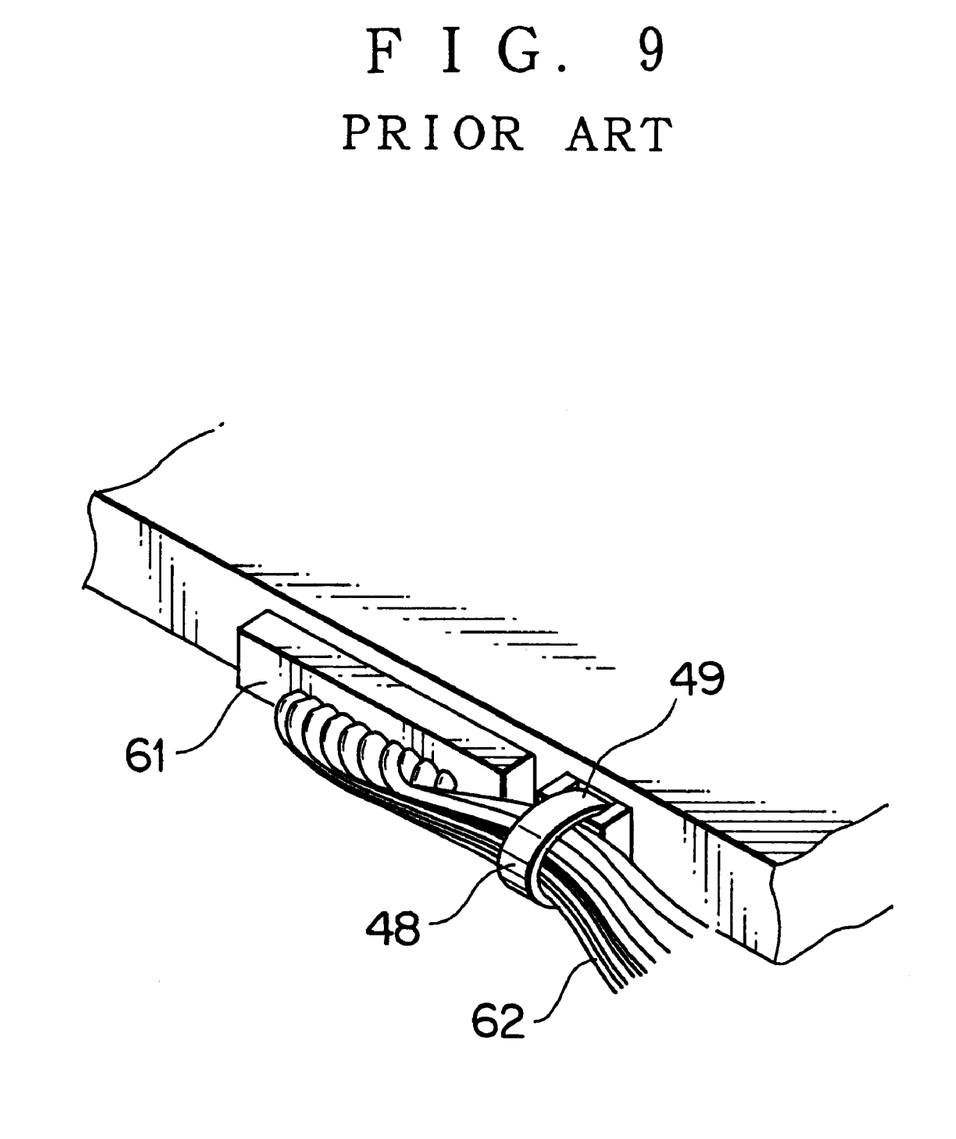
FIG. 9 is a perspective view illustrating a conventional wire guiding out structure of a wire protector.

The wires 62 (the trunk part) are straightly guided out from one end of the plate 72 (resin body 71) toward outside. As shown in FIG. 9, these plurality of wires 62 are bent by about 90° toward a connecting direction and bundled by a band 48 made of synthetic resin. The band 48 is fixed with a hole 49 of the wire protector 61. This bending and fixing of the wires 62 may be performed before the wire protector 61 is insert molded.

In FIG. 8, a rectangular bus bar 90 made of conductive metal is connected to the electric contact 67 of the terminal 66 (see FIG. 7) for use in voltage detection and in such a situation the insert molding is performed. The bus bar 90 has two holes 73, into which the male screw-type electrode 70 of each battery 69 (see FIG. 10) is inserted and tightened with a nut (not shown in the figure). The bus bar 90 connects two adjacent batteries 69 in series.

The electric contact 67 of the terminal 66 (see FIG. 7) is tightened at a hole 73 of the bus bar 90 by a nut. Near an end of the plate 72, a bus bar 74 having one hole is disposed and a wire (not shown in the figure) for supplying electric power is connected to the bus bar 74.

Figure 10:
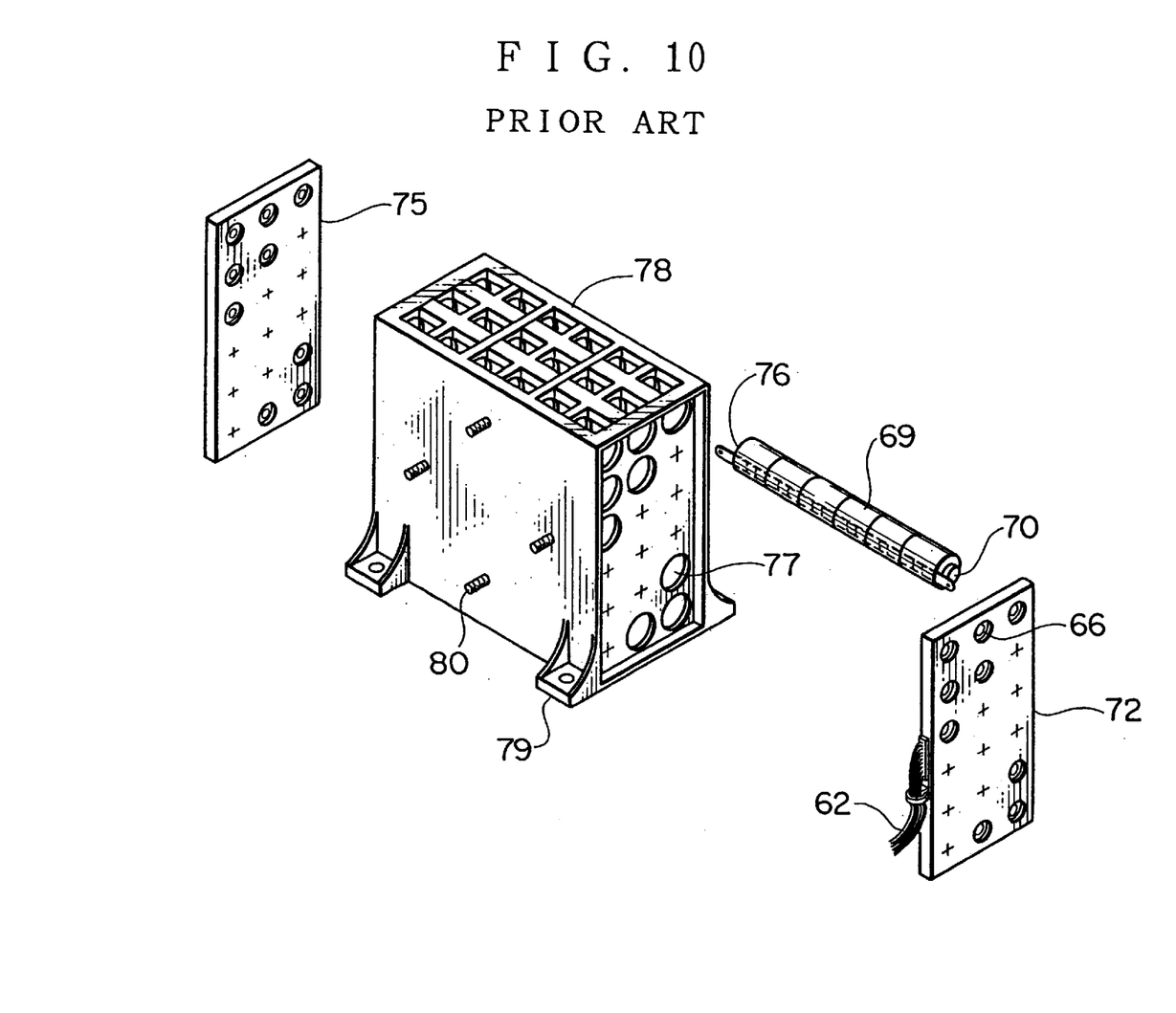
FIG. 10 is an exploded perspective view illustrating how a battery connecting plate is used.

FIG. 10 illustrates that the battery connecting plate 72 is connected to the electrode 70 at one end of the cylindrical battery 69 and that the other battery connecting plate 75 is connected to an electrode 76 at an opposite end of the battery 69.

The battery 69 is inserted into a holder 78 having a plurality of round holes 77, then the plates 72 and 75 are connected to the electrodes 70 and 76, respectively, being tightened with nuts. The holder 78 is fixed on a vehicle body by brackets 79 and bolts 80. The terminal 66 for use in voltage detection is disposed on the plate 72 and the wires 62 continuing to the terminal 66 are guided out toward the direction of connection.

However, as to the conventional wire protector 61 described above, as shown in FIG. 9, a process that the guided out wires 62 are bent toward the direction of connection so as to be fixed with the band 48 is a time-consuming work and has a poor workability.

Figure 11:
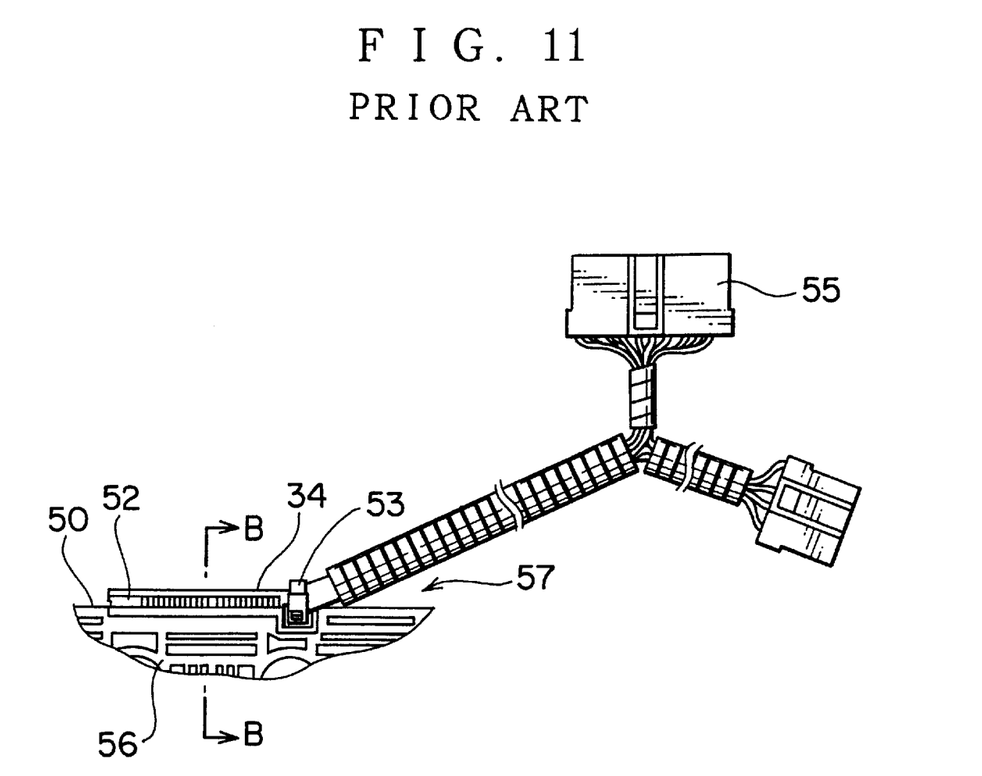
FIG. 11 is a plan view illustrating another conventional wire guiding out structure of a wire protector.
Figure 12:
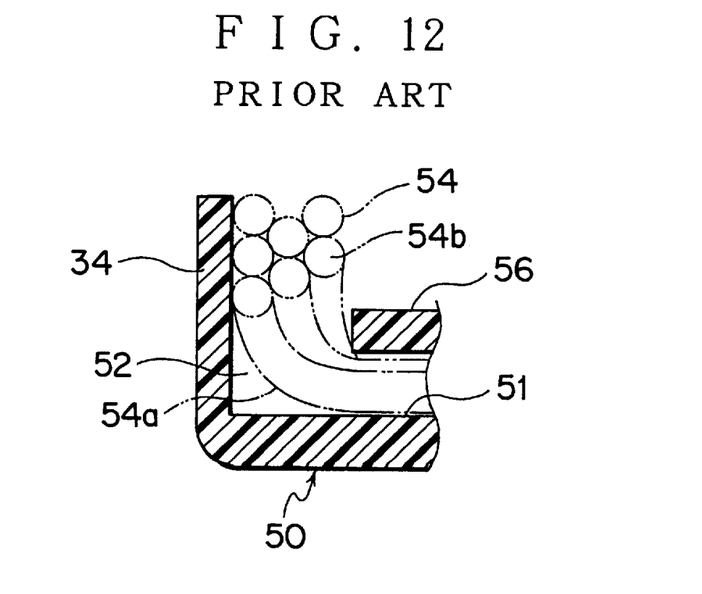
FIG. 12 is a sectional view taken along B—B line in FIG. 11.

FIGS. 11 and 12 illustrate a wire guiding out structure of a wire protector that was designed by the present applicant previously.

In this structure, a tub-like wire guide wall 34 for guiding wires out is integrally formed at the front end of a protector body 50 made of synthetic resin. Inside the wire guide wall 34, there is formed a guide groove 52 extending perpendicularlly to an insertion path 51 for trunk wires (see FIG. 12) of the protector body 50. At an end of the guide groove 52, there is provided a band 53 for bundling wires.

A plurality of wires 54 (see FIG. 12), passed through the insertion path 51 for trunk wires of the protector body 50, are bent along the guide groove 52 to be guided out toward outside and fixed by a band 53. Bent portions 54a and 54b of the wires 54 are protected from being interfered from outside by the wire guide wall 34. A terminal (not shown in the figure) is crimped on an end of each wire 54 and each terminal is inserted in a connector 55. The protector 57, in which a cover 56 (see FIG. 12) is put on the protector body 50, is insert molded within a resin (similarly to FIG. 8), thereby a battery connecting plate is formed. The plate is connected to a voltage detector through the connector 55.

However, as to the conventional wire guiding out structure of a wire protector, in order to mold the wire guide groove 34 integrally with the protector body 50, a mold has to have a space for the wires 54 to step aside at the guiding out side of the wires 54 with respect to the mold, therefore, the structure of the mold becomes complicated and the cost thereof becomes high. In addition, a plurality of wires 54 must be bent and installed within the narrow guide groove 52, causing a time-consuming work. Moreover, as shown in FIG. 12, the wires 54 from the protector body 50 once arise upward (perpendicularlly) and then bend laterally (horizontally) in the guide groove 52, therefore, the cover 56 easily comes off due to a force arised in an upper direction in FIG. 12, resulting in that the wires 54 in the guide groove 52 are dispersed and broken out from the guide groove 52.

SUMMARY OF THE INVENTION

It is therefore an objective of the present invention to solve the above problem and to provide a wire guiding out structure of a wire protector, which prevents the mold, for forming the wire guide wall at the protector body made of resin, from becoming complicated and expensive, enables the wires guided out from the protector body to bend in a direction of connection easily and securely, and prevents the cover from coming off upon the bending of the wires.

In order to attain the above objective, the present invention is to provide a wire guiding out structure of a wire protector comprising: a protector body for receiving wires; a cover for covering the protector body; a wire guiding out portion of the protecter body, by which the wires are bent and guided out; a wire guide wall retractively formed in the wire guiding out portion in use of flexible hinges; wire guiding out walls provided at both sides of the wire guiding out portion; and a notched opening formed inbetween the wire guiding out walls, for being engaged with the wire guide wall, wherein the wires are bent and guided out along the wire guide wall in a state of the wire guide wall being closed.

The wire guide wall further comprises a hook and the wire guiding out portion further comprises a supporting shaft to be engaged with the hook.

The wire guide wall further comprises latches and the wire guiding out walls further comprise engaging parts to be engaged with the latches.

The wire guiding out portion further comprises engaging holes to be engaged with latches of the cover.

Except the wire guiding out portion, the wire protector is insert molded within a resin material so as to form a part of a battery connecting plate.

BRIEF DESCRIPTION OF THE DRAWINGS

FIG. 6 is a perspective view illustrating a wire protector assembly, in which a cover is put on;

DESCRIPTION OF THE PREFERRED EMBODIMENTS

In the following, the preferred embodiments of the present invention are explained in detail with reference to the attached drawings.

Figure 1:
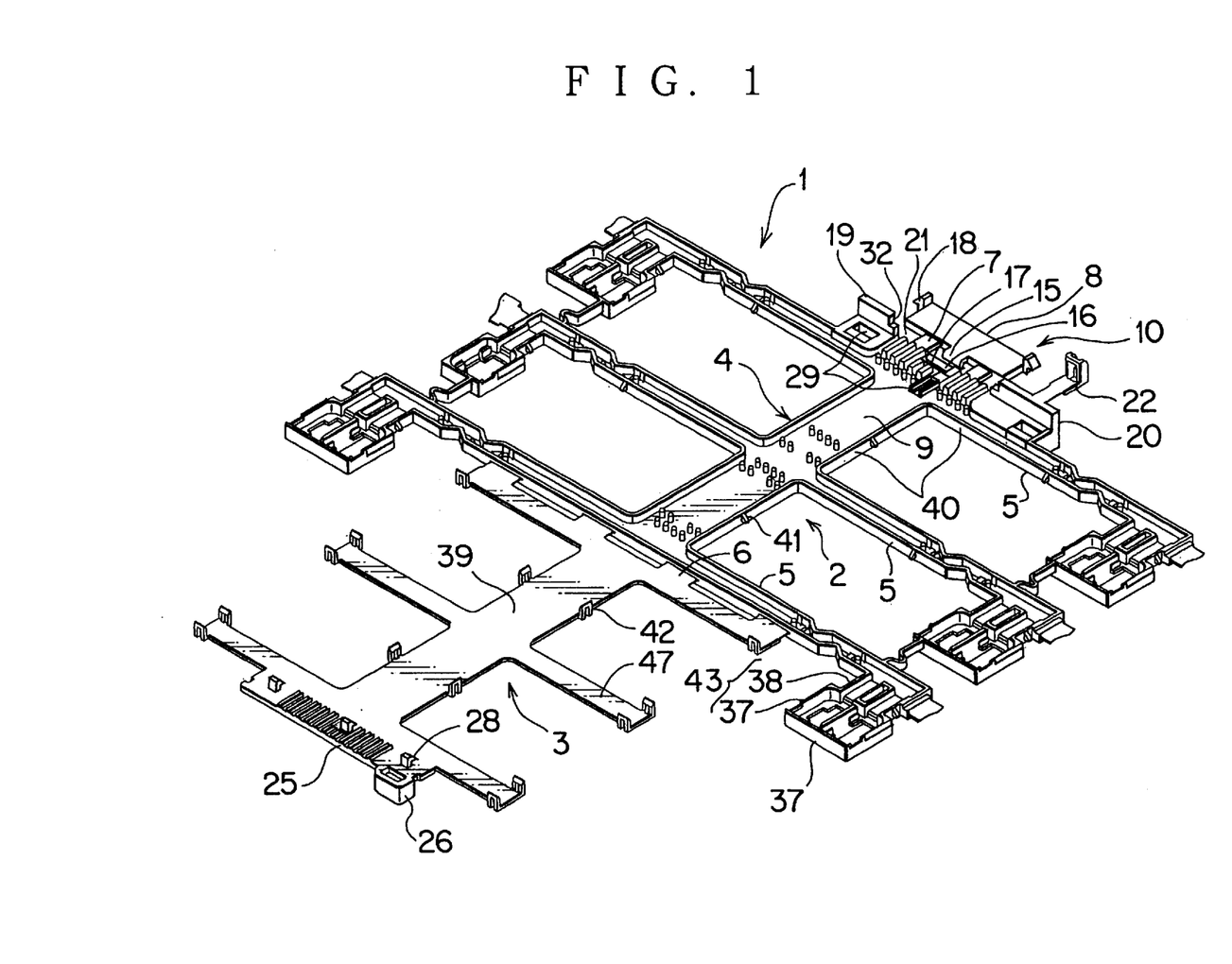
FIG. 1 is a perspective view illustrating a preferred embodiment of a wire guiding out structure of a wire protector according to the present invention.

FIG. 1 illustrates a preferred embodiment of a wire guiding out structure of a wire protector according to the present invention.

In a wire protector 1 having: a protector body 2 made of synthetic resin, which includes a wide trunk part 4 (trunk wires) and branch parts 5 (branch wires) crossing at right angles with the trunk part 4; and a cover 3 integrally formed with the protector body 2 in use of a hinge 6, this wire guiding out structure is characterized in that a wire guide wall 8 is retractively formed at a front end of the protector body 2 in use of a pair of thin hinges 7 extending in an extending direction of the trunk part 4. The wire guide wall 8 is situated horizontally on the identical plane with that of a bottom wall 9 of the trunk part 4 and branch parts 5.

Figure 2:
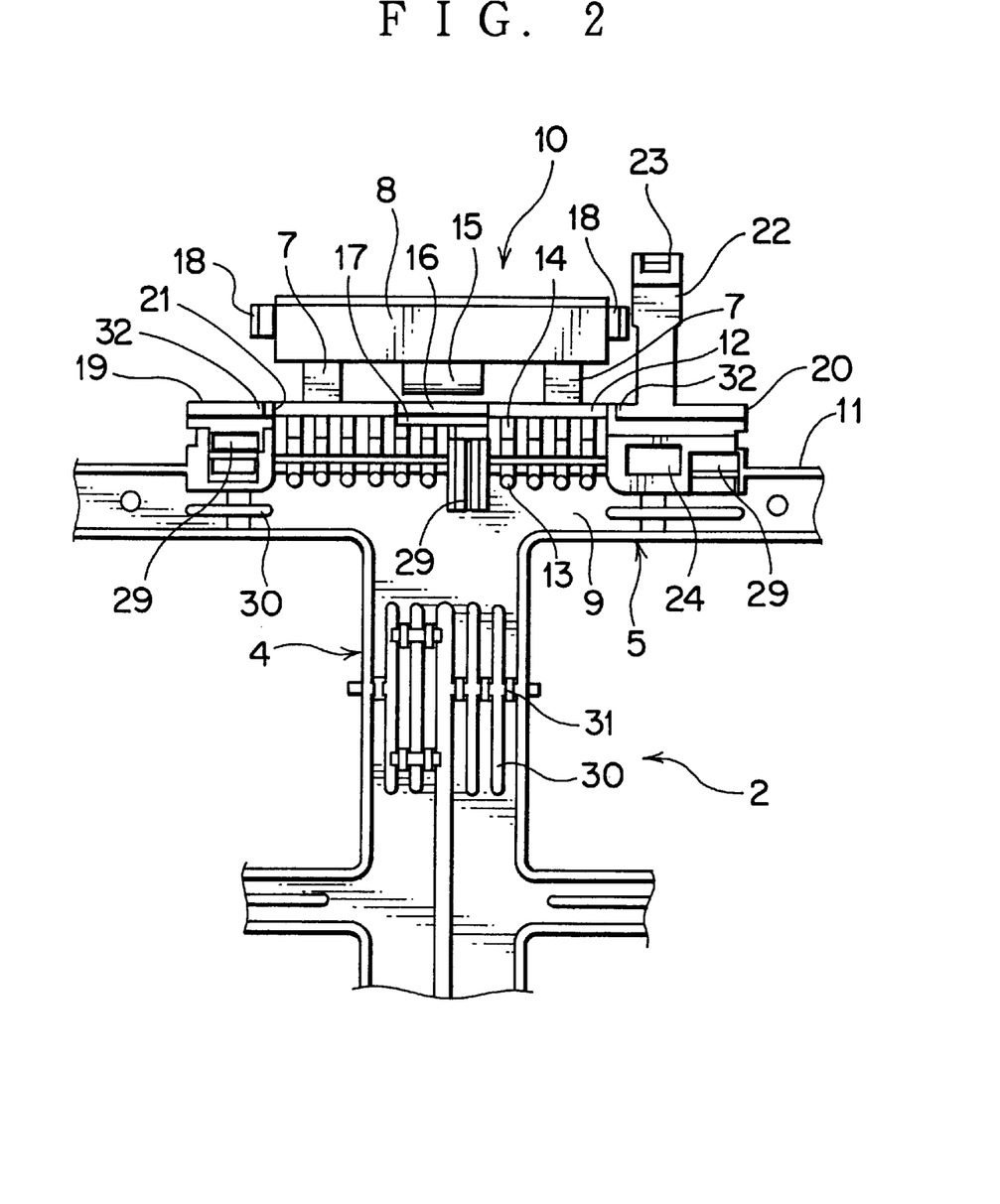
FIG. 2 is a top plan view illustrating a primary part of a wire guiding out structure of a wire protector.

FIG. 2 is a top plan view illustrating a wire guiding out portion 10 and the vicinity as to the wire guiding out structure of the wire protector 1. As shown in FIG. 2, a side wall 11 of a front branch part 5 is notched at its crossing part with the trunk part 4 and the vicinity, a projecting bottom wall 12 is formed integrally with the bottom wall 9 of the branch part 5 in an extending direction of the trunk part 4, a plurality of guide pins 13 are formed in a row in a longer direction of the branch part 5 from the bottom wall 9 of the branch part 5 instead of the side wall 11, guide ribs 14 are formed on the projecting bottom wall 12 adjoining the front of the respective guide pins 13, a pair of the flexible hinges 7 are protrudingly formed integrally with the projecting bottom wall 12 therefrom, and the wire guide wall 8 is integrally connected to each hinge 7.

The wire guide wall 8 is connected to the projecting bottom wall 12 in use of the hinges 7. A hook 15 is formed integrally with the wire guide wall 8 from an edge thereof between a pair of the hinges 7. At the front end of the projecting bottom wall 12, a supporting shaft 16 and insertion hole 17 for the hook 15 are formed adjacently front and behind with each other. The supporting shaft 16 is formed thinner than the thickness of the projecting bottom wall 12 between the insertion hole 17 and the front end of the projecting bottom wall 12.

At both side ends of the wire guide wall 8, a pair of latches 18 are protrudingly formed in the thickness direction of the wire guide wall 8. The latch 18 is placed near the front end of the wire guide wall 8. At both sides of the front end of the projecting bottom wall 12, a pair of wire guiding out walls 19 and 20 having a height that is the same with the width of the wire guide wall 8 arises, wherein each latch 18 of the wire guide wall 8 can engage with an inner end of the respective wire guiding out wall 19 or 20. A notched rectangular opening 21 (see FIG. 1), with which the wire guide wall 8 engages, is formed between a pair of the wire guiding out walls 19 and 20.

At an upper end of the wire guiding out wall 20, that is a wire guiding out wall of the wire guiding out direction side, flexible thin band 22 is integrally formed therewith. An engaging framework 23 is formed at an end of the band 22 and a hole 24 for releasing the engagement of the engaging framework 23 is formed on the projecting bottom wall 12. An engaging latch to be engaged with the engaging framework 23 is formed inside a rectangular cylinder 26 of a protruding wall 25 of the cover 3 (see FIG. 1). It is also possible to form the engaging latch to be engaged with the engaging framework 23 on the projecting bottom wall 12. The wires 27 (see FIG. 5) arise from a groove between guide ribs 14, then they are bent by 90° (i.e. horizontally) and guided out toward outside after passing through between the wire guiding out wall 20 and the hole 24.

At both sides and the center of the projecting bottom wall 12, engaging holes 29 to be engaged with latches 28 of the protruding wall 25 of the cover 3 (see FIG. 1) are formed and a latch is protrudingly formed in each engaging hole 29. The three latches 28 (see FIG. 1) securely fix the cover 3 on the wire guiding out portion 10 of the protector body 2. In this manner, even if the wires 27 (see FIG. 5) suffer an upward force in the wire guiding out portion 10, the cover 3 never comes off.

As shown in FIG. 2, in the trunk part 4 and the branch parts 5 in which the wires run, ribs 30 for partitioning the wires raise from the respective bottom walls 9. Projections 31 for holding the wires are formed at importamt positions of the ribs and sidewalls of the trunk part 4 and the branch parts 5. The ribs 30 are not shown in FIG. 1.

Figure 3:
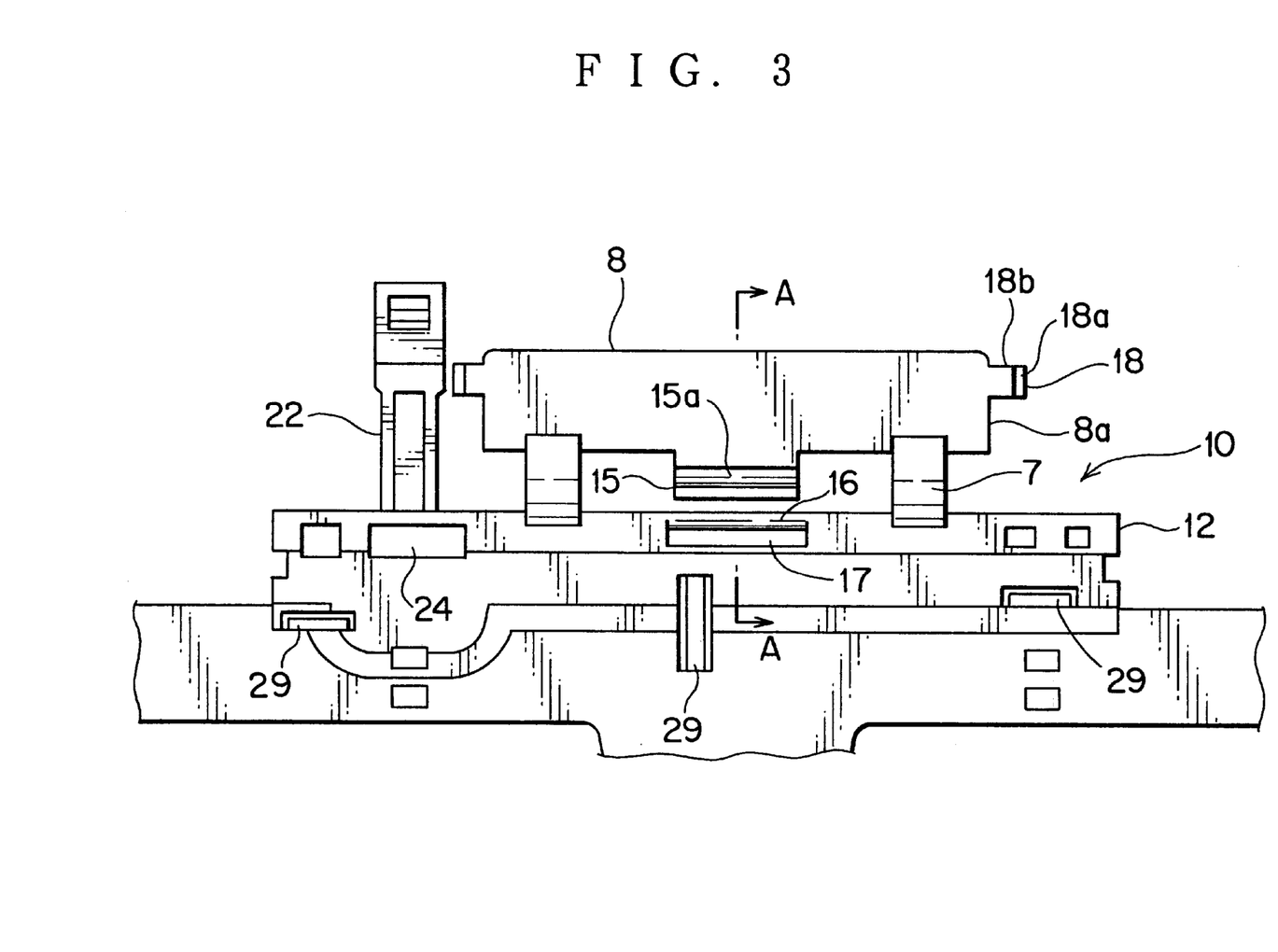
FIG. 3 is a bottom plan view illustrating a primary part of a wire guiding out structure of a wire protector.

FIG. 3 is a bottom plan view illustrating the wire guiding out portion 10 and the vicinity as to the wire guiding out structure of the wire protector 1. As shown in FIG. 3, one end of the thin hinge 7 is connected to a lower surface of the wire guide wall 8 and the opposite end of the hinge 7 is connected to a lower surface of the projecting bottom wall 12. A bottom part 18b of each latch 18 protrudes a little more outside compared to a side end 8a of the wire guide wall 8 and a horizontal latch surface 18a of the latch 18 protrudes more outside compared to the bottom part 18b. As shown in FIG. 1, the wire guiding out walls 19 and 20 are provided with ramp-like engaging parts 32 that are inserted and engaged with bending the respective latches 18. The engaging parts 32 may be formed at an inside end of the wire guiding out walls 19 and 20.

In FIG. 3, abbreviation numeral 15 denotes a hook, 15a a groove of the hook 15, 16 a supporting shaft to be engaged with the hook 15, 17 an insertion hole for inserting the hook 15, 22 a band, 24 a hole, and 29 an engaging hole to be engaged with the latch 28 of the cover 3.

Figure 4:
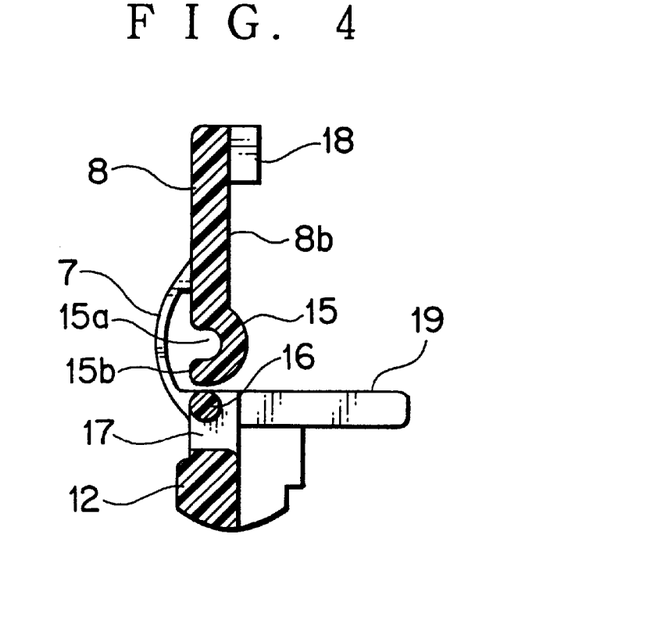
FIG. 4 is a sectional view including a wire guide wall taken along A—A line in FIG. 3.

FIG. 4 is a sectional view including the wire guide wall 8 taken along A—A line in FIG. 3. As shown in FIG. 4, the hook 15 of the wire guide wall 8 is formed curved to be a half circle-shape. The hook 15 curves protrudingly to an upper surface 8b (i.e. inner surface when rotated) of the wire guide wall 8. An end 15b of the hook 15 is situated on the same plane with that of a lower surface of the wire guide wall 8.

Figure 5:
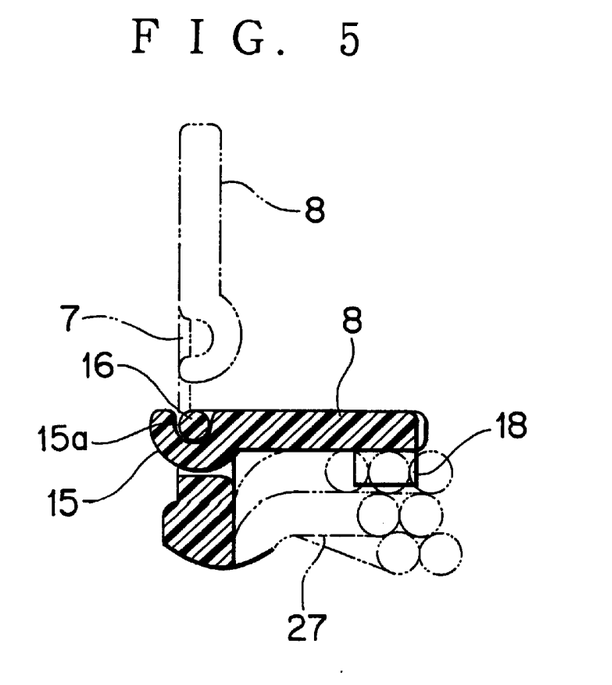
FIG. 5 is a sectional view illustrating a situation, in which a wire guide wall is closed.

The projecting bottom wall 12 is provided with the supporting shaft 16 for receiving the hook 15 and a hole 17 is formed behind the supporting shaft 16. Preferably, the supporting shaft 16 has a cylindrical shape to fit in the groove 15a of the hook 15. The abbreviation numeral 19 denotes the wire guiding out wall. The hinge 7 can easily be bent with a weak force as shown in FIGS. 4 and 5.

In the following, each example will be explained as to methods how the wires 27 (see FIG. 5) are bent and guided out in the wire guiding out portion 10.

As to a first method, the wires wired in the trunk part 4 and branch parts 5 are straightly guided out from the notched opening 21 in the extending direction of the trunk part 4 along the guide pins 13 and the guide ribs 14 (see FIG. 2). Then, as shown in FIG. 5, the wire guide wall 8 is pressed toward the supporting shaft 16, the hook 15 is engaged with the insertion hole 17 with bending the hinge 7, that is, the groove 15a of the hook 15 is engaged with the supporting shaft 16 and then, the wire guide wall 8 is raised by rotation around the supporting shaft 16 as a supporting point, thereby the wire guide wall 8 bends the wires 27 toward the rising direction of the wire guide wall 8 (i.e. the vertical direction in FIG. 1). The wire guide wall 8 is locked to the wire guiding out walls 19 and 20 with the latches 18.

Then, the wires 27 are bent by hand into the horizontal direction (i.e. bent by 90°), guided out toward outside along the wire guiding out wall 20 (see FIG. 2), and then fixed in a bundle with the band 22. Here, the wire protector 1 is insert molded in a resin material in advance on a condition of an assembly 33 shown in FIG. 6, that is, the wire protector 1 is made as a part of a battery connecting plate, thereby preventing the cover 3 from coming off from its engagement due to a repulsive force when the wires 27 are raised to be bent.

As shown in FIG. 5, when the hook 15 engages with the supporting shaft 16, the hook 15 bends (i.e. protrudes) toward the rising direction of the wire guide wall 8, that is, the hook 15 bends toward the opposite direction of that of the hinge 7, therefore the engagement between the hook 15 and the supporting shaft 16 is easily performed. Moreover, the repulsive force by the wires 27, which presses the wire guide wall 8 toward outside, is received by the supporting shaft 16 and the latches 18, thereby preventing the hook 15 from coming off from its engagement.

Furthermore, in comparison with the conventional wire guiding out structure of a wire protector, which contains a vertical wire guide wall 34 as shown in FIG. 12, the wires 27 (see FIG. 5) can be straightly extended from the trunk part 4 (see FIG. 2) toward the extending direction of the trunk part 4 in a condition that the wire guide wall 8 is opened to keep it horizontal, therefore, the wires 27 can be easily wired into the protector body 2. When the cover 3 (see FIG. 1) is put on (i.e. closed) on this condition, the cover 3 suffers no force to open the cover 3 (i.e. the repulsive force by the wires 27), therefore the cover 3 is easily put on the protector body 2. In addition, the wire protector 1 can be molded in a condition that the wire guide wall 8 is kept horizontal, therefore the manufacturing of a mold (not shown in the figure) becomes easy, since the mold has no need to have a space for the wires 54 to step aside. Thereby, the structure of the mold becomes simple and the cost thereof becomes low.

As to a second method, on a condition that the wire guide wall 8 is opened (i.e. laid horizontally), the wires 27 are straightly guided out from the notched opening 21 along the guide pins 13 and the guide ribs 14, then, in a condition that the cover 3 is put on the protector body 2, the wires 27 (see FIG. 5) are bent by hand into the horizontal direction (i.e. bent by 90°), guided out along the inside of the wire guiding out wall 20, and then fixed in a bundle with the band 22. Then, the wire guide wall 8 is closed (i.e. rotated by 90°) with engaging the hook 15 of the wire guide wall 8 with the supporting shaft 16. The bent portion of the wires 27 is protected from being interfered from outside by the wire guide wall 8.

With the method mentioned above, since the wire guide wall 8 suffers no repulsive force by the wires 27 upon closing of the wire guide wall 8, the closing thereof can be easily performed. Similarly to the first method, since the cover 3 directly engages with the wire guiding out portion 10 of the protector body 2, even on a condition that the wire protector 1 before an insert molding is monolithic, an engaging strength strong enough against the repulsive force by the wires 27 upon their bending is secured, thereby preventing the cover 3 from coming off from its engagement.

Figure 6:
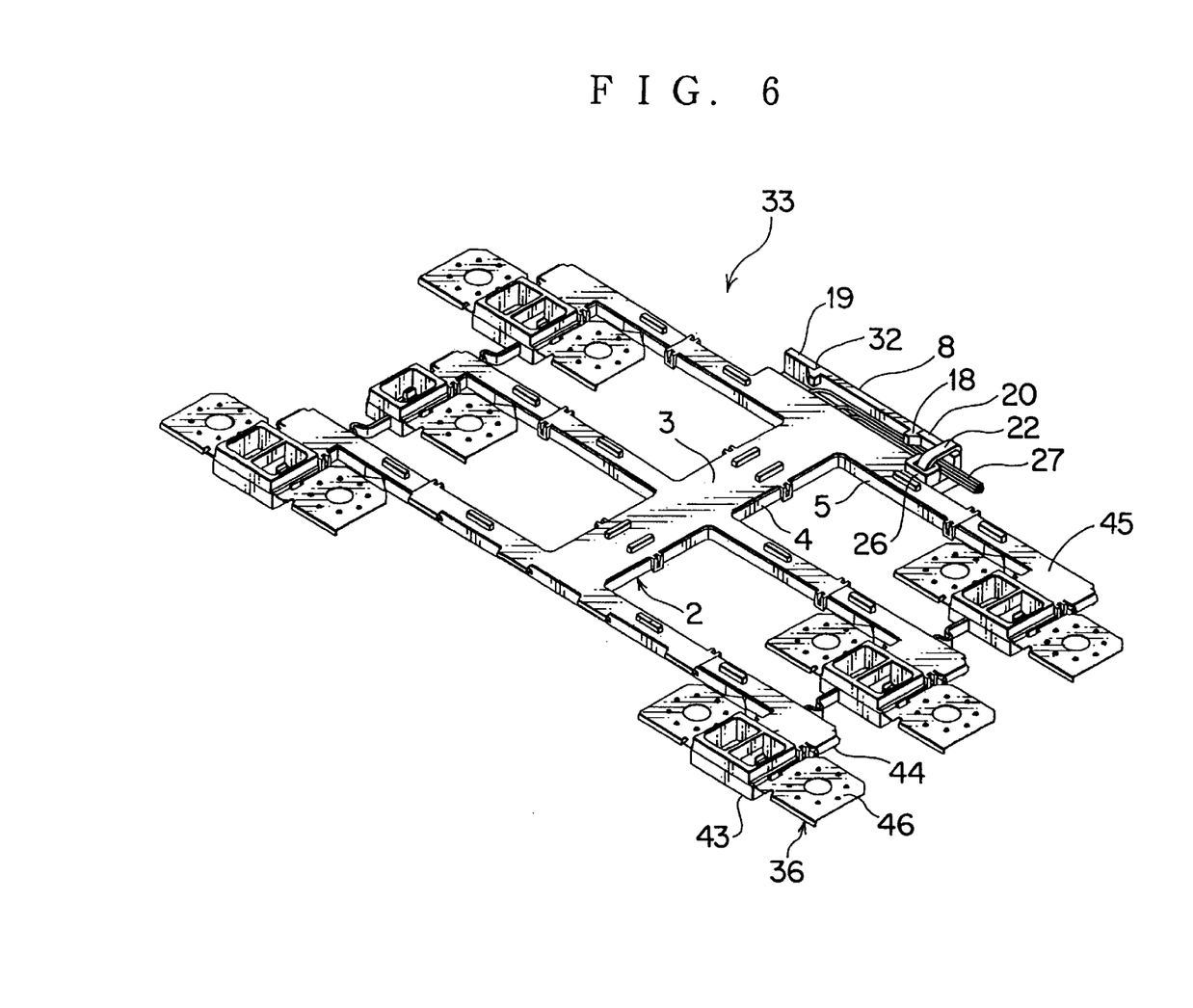

FIG. 6 illustrates a situation that the cover 3 is vertically put on the protector body 2 and the wires 27 are guided out. The wire guide wall 8 is engaged with the wire guiding out walls 19 and 20 by the latches 18 and situated on the same plane with that of the wire guiding out walls 19 and 20. The band 22 is engaged with the inside of the rectangular cylinder 26 at the cover 3 side.

In the following, an overall explanation as to the above wire protector 1 will be given with reference to FIGS. 1 and 6.

As shown in FIG. 1, each branch part 5 extends from both sides of the trunk part 4 at the front end, the rear end and the center of the trunk part 4. At each end of the branch part 5, a frame 37 for receiving a part (not shown in the figure) for connecting to a fuse of terminals 36 (see FIG. 6) for detecting voltage is formed, then a tub-like part 38 for receiving a wire-crimping part (not shown in the figure) of the terminals 36 is formed adjoining the frame 37. A constitution except the wire guiding out portion 10 is almost the same with that described in Japanese Patent Application No. H10-287904. The wire protector employing the structure of the wire guiding out portion 10 according to the present invention is not limited to the embodiments described above.

The cover 3 made of synthetic resin is integrally formed to the branch part 5 at the rear end of the protector body 2 by way of the thin hinge 6. The cover includes a wide-width part 39 for covering the trunk part 4, narrow-width parts 47 for covering the branch parts 5 and a flange part 25 for covering the latter half (i.e. base side) of the wire guiding out portion 10. Each projection 41 is formed on the outer side of the respective side wall 40 of the protector body 2 and each engaging part 42 to be engaged with the respective projection 41 is formed at the corresponding portion of the cover 3.

On a condition that the wires are crimp-connected onto the terminals 36 (see FIG. 6) for detecting voltage, the terminals 36 are received into a receiving part 43, then the wires pass through the branch part 5 and the trunk part 4, finally the wires are guided out toward outside from the wire guiding out portion 10.

On a condition that the cover 3 is put on the protector body 2 as shown in FIG. 6, the greater part of the trunk part 4 and branch part 5 is covered with the cover 3, while each end portion of the branch part 5 is covered with the respective subcover 45 (not shown in FIG. 1) that continues to the receiving part 43 by way of a hinge part 44. A connector (not shown in the figure) for connecting to a voltage detector is disposed at an end of the guided out wires 27.

The wire protector assembly 33 shown in FIG. 6 is insert molded within a resin material, thereby the battery connecting plate is completed.

The wire guiding out structure described above can be employed not only for the wire protector 1 for use in the battery connecting plate but also for a wire protector for protecting wire-harness. The present invention is not limited to the preferred embodiments of the wire protector 1 described above. That is, the aforementioned preferred embodiments are described to aid in understanding the present invention and variations may be made by one skilled in the art without departing from the spirit and scope of the present invention.

According to the present invention, the protector body can be molded on a condition that the wire guide wall is opened in a horizontal direction, which is the same with the extending direction of the wires, therefore the manufacturing of a mold becomes easy, since the mold has no need to have a space for the wires to step aside. Thereby, the structure of the mold becomes simple and the cost thereof becomes low. In addition, the wires can be guided out from the notched opening on a condition that the wire guide wall is opened and then, the wires can be bent by pressing the wires with closing the wire guide wall, thereby the wires can be easily guided out. In addition, the wires can be wired and received in the protector body on a condition that the wire guide wall is opened, thereby the wires can be easily wired.

The hook is engaged with the supporting shaft with bending the hinge by pressing the wire guide wall toward the supporting shaft, thereby the wire guide wall can be securely joined to the wire guiding out portion without falling. Then, the wire guide wall is rotated around the supporting shaft as a supporting point, consequently, the wire guide wall can be securely engaged (i.e. closed) with the notched opening, thereby the wires can be easily guided out.

The wire guide wall can be securely and firmly locked to the wire guiding out walls with the latches, thereby the wire guide wall is securely prevented from opening abruptly due to the repulsive force by the bent wires.

The cover can be directly engaged with the wire guiding out portion, therefore, the cover is firmly engaged with the protector body, thereby the cover is securely prevented from opening due to the repulsive force by the bent wires.

The wires are wired in the protector body, then the wire protector is insert molded on a condition that the cover is put on the protector body and made as a part of the battery connecting plate and then, the wire guide wall is closed and the wires can be bent, therefore, the cover never opens even if the cover suffers a strong repulsive force by the wires upon bending, thereby the wires can be easily guided out.

What is claimed is:

1. A wire guiding out structure of a wire protector comprising:
    a protector body for receiving wires;
    a cover for covering the protector body;
    a wire guiding out portion of the protecter body, by which the wires are bent and guided out;
    a wire guide wall retractively formed in the wire guiding out portion in use of flexible hinges;
    wire guiding out walls provided at both sides of the wire guiding out portion; and
    a notched opening formed inbetween the wire guiding out walls, for being engaged with the wire guide wall, wherein the wires are bent and guided out along the wire guide wall in a state of the wire guide wall being closed.

2. The wire guiding out structure of a wire protector according to claim 1, wherein the wire guide wall further comprises a hook and the wire guiding out portion further comprises a supporting shaft to be engaged with the hook.

3. The wire guiding out structure of a wire protector according to claim 1 or 2, wherein the wire guide wall further comprises latches and the wire guiding out walls further comprise engaging parts to be engaged with the latches.

4. The wire guiding out structure of a wire protector according to claim 1 or 2, wherein the wire guiding out portion further comprises engaging holes to be engaged with latches of the cover.

5. The wire guiding out structure of a wire protector according to claim 1 or 2, wherein except the wire guiding out portion, the wire protector is insert molded within a resin material so as to form a part of a battery connecting plate.

* * * * *